July 6, 1926.

M. A. SILVA 1,591,686

CARRYING REEL FOR AUTOMOBILE TOWROPES

Filed Oct. 10, 1922

INVENTOR
MANUEL A. SILVA
BY
Harry C. Schweder
ATTORNEY

Patented July 6, 1926.

1,591,686

UNITED STATES PATENT OFFICE.

MANUEL A. SILVA, OF ALAMEDA, CALIFORNIA, ASSIGNOR TO NATIONAL SPECIALTY MANUFACTURING COMPANY, A CORPORATION OF CALIFORNIA.

CARRYING REEL FOR AUTOMOBILE TOWROPES.

Application filed October 10, 1922. Serial No. 593,563.

My invention is an improved carrying reel for automobile tow ropes.

The object of my invention is to provide a convenient way of carrying an automobile tow rope, so that it may be readily accessible when needed.

Another object of my invention is to provide a reel which is simple in construction and efficient in operation.

Referring to the drawing which forms a part of this specification—

Figure 1:
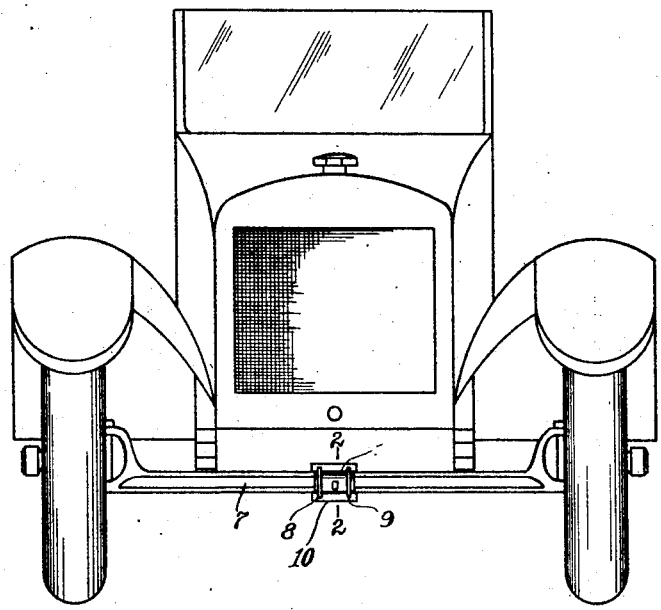
Figure 1 is a front view of an automobile with my reel attached thereto.
Figure 2:
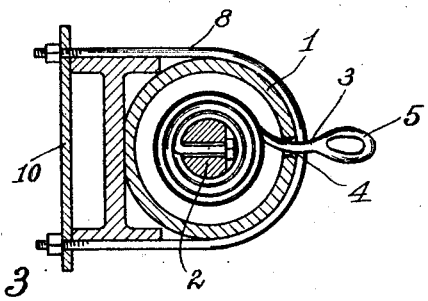
Figure 2 is a sectional view taken on the line 2—2 of Figure 1.
Figure 3:
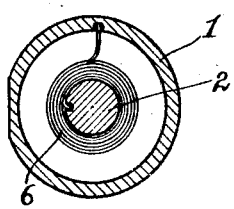
Figure 3 is a transverse sectional view of my reel showing the rewinding spring.

Referring more particularly to the drawing:—the numeral 1 indicates the casing of my reel, in the side walls of which is journaled a shaft 2.

A cable 3 has one end thereof secured to the shaft 2 and extends thru a hole 4 in the casing 1.

A knot 5 in the end of the cable prevents its passing thru the hole 4.

A spring 6 encircles the shaft, one end of which is secured to said casing 1. The spring 6 tends to hold the cable 3 coiled about the shaft 2, and said cable is withdrawn against the tension of said spring.

The casing 1 is secured to the front automobile axle 7 by means of clamps 8 and 9, which pass around said axle and casing and thru a plate 10 on the rear face of the axle.

The cable 3 is withdrawn from the casing 1, when desired, against the tension of the spring 6, and on completion the cable is released and the spring 6 again rewinds it on the shaft 2.

Having described my invention I claim:—

The combination with an axle of a vehicle, of a tow rope reel attached thereto, said reel comprising a cylindrical casing having a flattened surface adapted to bear against the flattened surface of the axle, a plate bearing against the opposite side of the axle to that which the reel bears against, U-shaped bolts for securing said reel to said plate, a shaft rotatively mounted in said reel, and having an opening therein, and a recess communicating with said opening, a tow rope having one end passed through the opening in said shaft and having its head disposed in the recess in said shaft, said casing having an opening through which the other end of said tow rope is passed, the exposed end of said tow rope having an eyelet fastened therein, said eyelet being adapted to prevent the exposed end from entering said casing, and a spring for winding said reel so as to wind the tow rope about said shaft when said rope is not in use.

In testimony whereof I affix my signature.

MANUEL A. SILVA.